United States Patent [19]

Geisthoff

[11] 4,075,872
[45] Feb. 28, 1978

[54] TELESCOPING TORQUE TRANSMITTING SHAFT

[75] Inventor: Hubert Geisthoff, Lohmar, Germany

[73] Assignee: Jean Walterscheid GmbH, Lohmar, Germany

[21] Appl. No.: 707,105

[22] Filed: Jul. 20, 1976

[30] Foreign Application Priority Data

Jul. 22, 1975 Germany .................. 2532674

[51] Int. Cl.² ........................... F16D 3/06
[52] U.S. Cl. .................... 64/23.7; 64/9 R; 64/23
[58] Field of Search ........... 64/23.7, 23, 21, 9 R, 64/9 A; 308/6

[56] References Cited

U.S. PATENT DOCUMENTS

| 754,066 | 3/1904 | Hoffmann | 64/23 |
|---|---|---|---|
| 2,791,894 | 5/1957 | Dockworth | 64/23.7 |
| 2,932,180 | 4/1960 | Smith-Pert | 64/23.7 |
| 3,494,148 | 2/1970 | Young | 64/23 |

FOREIGN PATENT DOCUMENTS 948,539  2/1964  United Kingdom .................. 64/21

*Primary Examiner*—Benjamin W. Wyche
*Assistant Examiner*—R. C. Turner
*Attorney, Agent, or Firm*—Edmund M. Jaskiewicz

[57] ABSTRACT

A telescoping torque transmitting shaft includes an inner shaft element having a square cross section and an outer tubular shaft element. A plurality of axially extending rows of torque transmitting balls are seated in longitudinal grooves formed in the inner surface of the outer shaft element and engage surfaces of the inner shaft element. The balls are capable of rolling movement between the shaft elements and are retained and guided in a tubular element arranged between longitudinally spaced annular members attached to the inner surface of the outer shaft element. Springs at both ends of the tubular retaining member act against the annular members to bias the retaining member and the balls therein to a predetermined axial position with respect to the outer shaft element.

4 Claims, 4 Drawing Figures

TELESCOPING TORQUE TRANSMITTING SHAFT

The present invention relates to a telescoping torque transmitting shaft, more particularly, to such a shaft having ball torque transmitting elements which are also capable of rolling to accommodate relative axial displacement of the two shaft elements with respect to each other.

Various forms of telescoping torque transmitting shafts have been proposed for many applications, and particularly in agricultural machinery. One such shaft comprised an inner shaft element with a polygonal cross-section and an outer tubular shaft element having axial grooves in the inner face thereof for the accommodation and guidance of balls to transmit torque between the two shaft elements. The balls are arranged in axially extending rows for rolling movement and the rows engage the outer faces of the inner shaft element. Means are generally provided between the shaft elements for retaining and guiding the balls. One form of a ball retaining mean comprised a tubular member positioned between the inner and outer shaft elements and having pairs of longitudinally extending slots whose ends are interconnected by arcuate tracks. The balls in the slots transmit the torque and the ball circuit track enabled infinite variation in the length or axial displacement between the telescopingly positioned inner and outer shaft elements.

It has been discovered that particularly in torque transmitting shafts for agricultural machinery substantial variations of length in the shaft generally occur under conditions of low torque loads. Such conditions may occur when the three-point linkage attached implement is lifted or when the implement being towed by a tractor is being turned around in order to change the direction of working of the implement. Under relatively high torque conditions the variations in length of the torque transmitting shaft tend to be of a smaller magnitude. As a result of this relationship of length variations to torque loads the above described ball guide structure is too complicated and expensive a mechanism than is required to fulfill operational requirements.

In another form of a ball guide structure the balls are guided within a stationary ball cage and spiral springs are provided to act directly upon the balls. This structure provides that during relative axial movement of the inner and outer shaft elements the balls will roll freely between the shaft elements and at the same time a twist or torque will be imparted to the balls in order to distribute wear over the entire ball surface.

This structure had the disadvantage that the springs occupied an additional length since the lengths of the springs could not be utilized for length adjustment of the telescoping shaft elements. Further, this ball guide structure was specifically provided as a bearing for longitudinal shaft element movements to convert sliding friction into rolling friction during relatively short axial displacements. There was no application of this bearing structure for simultaneous torque transmission in telescoping torque transmitting shafts.

It is therefore the principal object of the present invention to provide a novel and improved telescoping torque transmitting shaft which is particularly adapted for agricultural machinery.

It is another object of the present invention to provide such a shaft which permits substantial adjustments of length between the telescoping shaft elements but which is relatively simple in structure and inexpensive to manufacture.

It is a further object of the present invention to provide such a shaft which permits relatively short length variations of the telescoping shaft elements under high torque loads to be accomplished smoothly, safely and free from undue stress.

According to one aspect of the present invention a telescoping torque transmitting shaft may comprise an inner shaft element having a polygonal cross-section and an outer tubular shaft element having a plurality of longitudinally extending grooves in its inner face. At least one axially disposed row of torque transmitting balls is positioned between the grooves and surfaces of the inner shaft element. The balls are capable of rolling movement between the shaft elements and means are provided for retaining and guiding the balls. On the inner surface of the outer shaft element are abutment means which are acted upon by spring means disposed at both ends of the ball retaining means for biasing the retaining means to a predetermined position with respect to one of the shaft elements.

The telescoping torque transmitting shaft of the present invention has the advantage that increased friction occurring under high torque loads between the outer shaft element, balls and inner shaft element which is accompanied by a relatively short length variation of the telescoping shaft elements is readily absorbed without any harmful effects on the shaft because the ball retaining structure is axially slidable between the outer and inner shaft elements. After the torque peak has subsided the springs immediately restore the ball retainer to a predetermined position between the shaft elements. Any likelihood of jamming, wedging, compression or fracture of the telescoping shaft elements are thus avoided.

Other objects and advantages of the present invention will be apparent upon reference to the accompanying description when taken in conjunction with the following drawings, which are exemplary, wherein.

Proceeding next to the drawings wherein like reference symbols indicate the same parts throughout the various views a specific embodiment and modifications of the present invention will be described in detail.

Figure 1A:
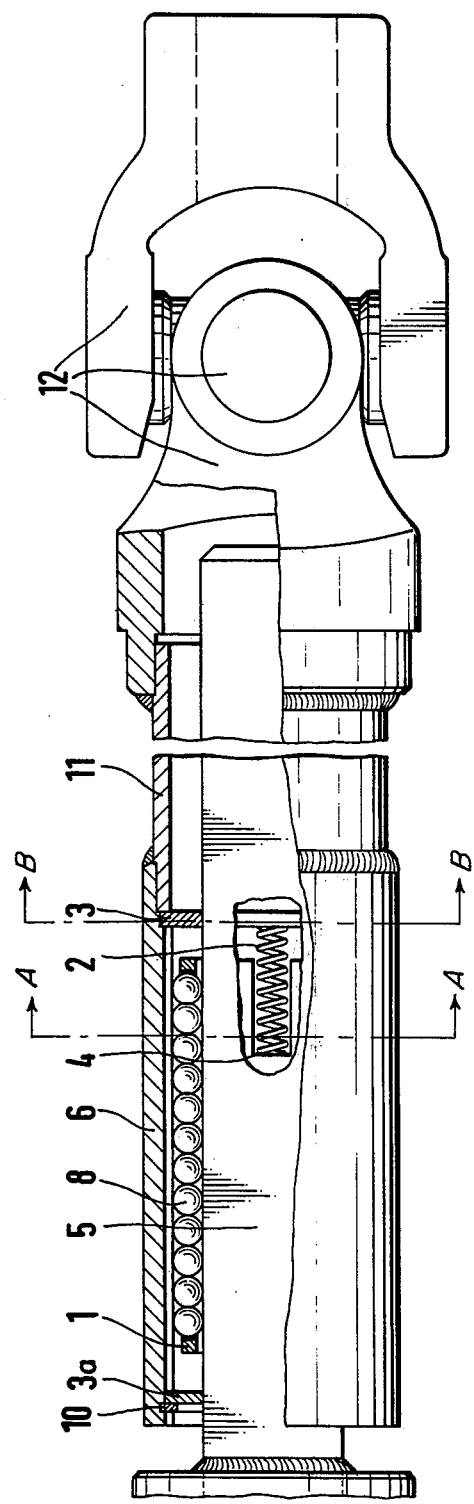
FIG. 1A is an elevational view of a telescoping torque transmitting shaft according to the present invention with one end of the shaft being connected to a universal joint and a portion of the shaft being cut away.
Figure 1B:
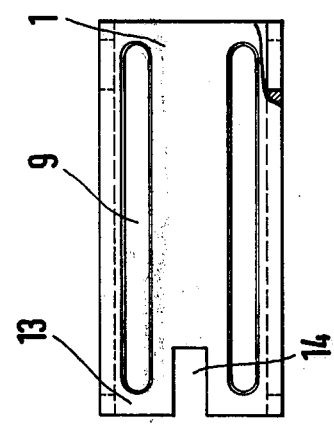
FIG. 1B is an elevational view of the ball retainer utilized in the shaft of FIG. 1A.

As may be seen in FIG. 1A, the telescoping torque transmitting shaft according to the present invention comprises an inner shaft element having a square cross-section whose end which is not shown in the drawing is rigidly connected with a yoke member of a universal joint. An outer tubular shaft element 6 surrounds and is co-axially positioned with respect to the inner shaft element 5 and the inner surface of the outer shaft element 6 is provided with a plurality of axially extending circumferentially spaced grooves 7. A plurality of axially extending rows of balls 8 are seated within the grooves 7 so as to engage the outer surfaces of the inner joint element 5 as shown in FIG. 2A to transmit torque between the two shaft elements.

Figure 2A:
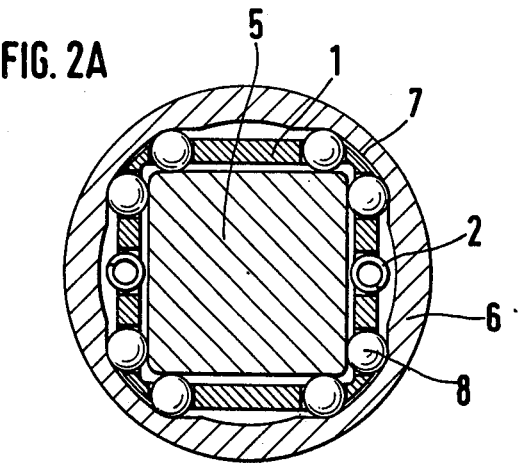
FIG. 2A is a sectional view taken along the line A—A of FIG. 1A.
Figure 2B:
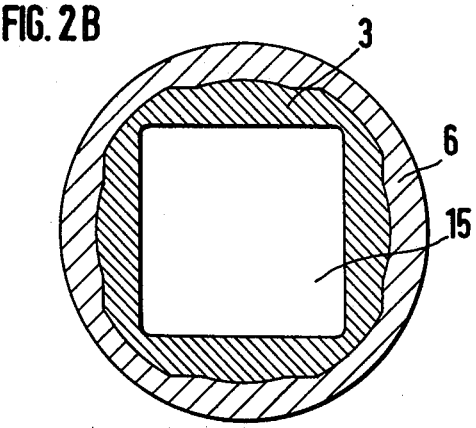
FIG. 2B is a sectional view taken along the line B—B of FIG. 1A.

The balls 8 are retained and guided by a ball retainer 1 which is tubular in shape and has a cross-section substantially conforming to the cross-section of the inner shaft element as may be seen in FIG. 2A. The outer surface 13 of the ball retainer 1 is provided with a pair of ball guide grooves 9 which are so shaped that none of the balls 8 can slip through if the inner shaft element 5 should be withdrawn from the outer shaft element 6. The balls 8 roll or slide along the hardened outer surfaces of the inner shaft element 5 on the one hand and in the grooves 7 of the outer shaft element 6 on the other hand.

Axially extending slots 14 are formed at the ends of ball retainer 1 to receive compression springs 2 therein. The springs 2 act between the ends 4 of the slots 14 and annular abutment members 3 and 3a which are attached to the inner surface of the outer shaft element 6. Each abutment member 3 and 3a has an opening 15 therein which slidably receives the inner shaft element 5. A snap ring 10 secures the abutment member 3a in position and abutment member 3 is secured in position by being located between the outer shaft element 6 and an end of an intermediate tubular member 11 which is fixedly connected to a yoke member of a universal joint 12. The length of the intermediate tubular member 11 is determined by the maximum axial displacement desired between the telescoping inner and outer shaft elements 5 and 6. Under normal torque loads, length adjustment of the transmission shaft, or axial variations between the telescoping shaft elements, is achieved by the inner shaft element 5 sliding into or being withdrawn from the intermediate tubular member 11.

The number and size of the balls 8 is determined by the magnitude of the torque loads to be transmitted and these balls which are capable of rolling movement between the shaft elements transmit the torque between these elements.

During adjustments or variations in the length of the transmission shaft during normal torque loads, the torque transmitting balls 8 will act as slide bearings since the ball retainer 1 will be maintained in a predetermined axial position with respect to the outer shaft element 6 by the pre-stressed restoring springs 2. The ball retainer 1 thus cannot move axially so as to impart any rolling movement to the balls. On a sudden occurrence of a torque peak or high torque load conditions, friction in this slide bearing will increase to such an extent that the axial thrust force will overcome the resistance of one of the restoring springs 2 and the ball retainer 1 will move axially. Accordingly, the balls 8 will roll along the outer faces of the inner shaft element 5 and in the ball track grooves 7 of the outer shaft element 6. At the same time that the balls are so rolling they will transmit driving torque between the shaft elements. It has been discovered that under actual operating conditions such torque peaks are of relatively short duration and thus variations in length of the transmission shaft are quite short. Thus the range of movement of the ball retainer 1 and the lengths of the grooves 7 in the outer shaft element can be relatively short. As the torque load decreases, the ball retainer 1 will be restored to its original predetermined axial position with respect to the outer shaft element and the balls will now function as a slide bearing while at the same time transmitting torque within the normal range of torque loads.

Under normal torque loads, relatively long variations in the length of the shaft can be readily accommodated by the sliding of the inner shaft element 5 upon the balls 8.

It is to be noted that during operation of the transmission shaft under normal conditions there will be an oscillating of the torque transmitted and this will maintain the ball retainer in its predetermined or central position because of the uniform forces applied at both ends of the ball retainer by the restoring springs. The spring loading corresponds to the force required to maintain the ballretainer in this neutral or original position.

It is further pointed out that the telescoping torque transmitting shaft of this invention comprises a smaller number of separate components than previously known constructions and that the initial bore in the outer shaft element may be made relatively large for reducing swarf volume during subsequent broaching of the ball grooves.

It will be understood that this invention is susceptible to modification in order to adapt it to different usages and conditions, and accordingly, it is desired to comprehend such modifications within this invention as may fall within the scope of appended claims.

What is claimed is:

1. A telescoping torque transmitting shaft particularly for agricultural machinery and the like comprising an inner shaft element having a polygonal cross-section to define a plurality of outer surfaces, an outer tubular shaft element having a plurality of longitudinal extending grooves in the inner face thereof, at least one axially disposed row of torque transmitting balls between said grooves and said surfaces of said inner shaft element, said balls capable of rolling movement between said shaft elements, abutment means comprising a pair of longitudinally spaced annular members on the inner surface of said outer shaft element and having openings therein to receive slidably said inner shaft element, means between said annular members for retaining and guiding said balls, said retaining means comprising a tubular element having a cross-section conforming to the cross-section of said inner shaft element and having a plurality of axially extending slots therein to receive rows of balls, and spring means comprising compression springs at both ends of said tubular retaining member and acting upon said annular members to bias said retaining means to a predetermined position with respect to one of said shaft elements, said inner shaft element being slidable upon its outer surfaces within said balls.

2. A telescoping torque transmitting shaft as claimed in claim 1 wherein said inner shaft element has a square cross-section.

3. A telescoping torque transmitting shaft as claimed in claim 1 wherein said retaining means is biased to an axial position with respect to said outer shaft element.

4. A telescoping torque transmitting shaft as claimed in claim 1 wherein there are axial slots from each end of said tubular retaining member to receive said compression springs.

* * * * *